US009876342B2

(12) United States Patent
Ghosh

(10) Patent No.: US 9,876,342 B2
(45) Date of Patent: Jan. 23, 2018

(54) COMPOSITIONS FOR ELECTRIC FIELD GRADING

(71) Applicant: 3M INNOVATIVE PROPERTIES COMPANY, St. Paul, MN (US)

(72) Inventor: Dipankar Ghosh, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 113 days.

(21) Appl. No.: 14/917,573

(22) PCT Filed: Sep. 15, 2014

(86) PCT No.: PCT/US2014/055635
§ 371 (c)(1),
(2) Date: Mar. 8, 2016

(87) PCT Pub. No.: WO2015/047769
PCT Pub. Date: Apr. 2, 2015

(65) Prior Publication Data
US 2016/0218498 A1    Jul. 28, 2016

Related U.S. Application Data

(60) Provisional application No. 61/882,197, filed on Sep. 25, 2013.

(51) Int. Cl.
H02G 15/184    (2006.01)
H02G 15/064    (2006.01)
C08K 3/22    (2006.01)

(52) U.S. Cl.
CPC .......... *H02G 15/184* (2013.01); *C08K 3/22* (2013.01); *H02G 15/064* (2013.01); *C08K 2003/2265* (2013.01); *C08K 2003/2275* (2013.01); *C08K 2201/001* (2013.01); *C08K 2201/01* (2013.01)

(58) Field of Classification Search
CPC .......... C08L 83/04; C08L 23/06; C08L 23/08; C08L 63/00; C08L 75/04; C08L 27/12–27/20; C08K 2003/2275
See application file for complete search history.

(56) References Cited

U.S. PATENT DOCUMENTS

| 4,234,439 A | 11/1980 | Kehr |
| 4,363,842 A | 12/1982 | Nelson |
| 4,431,861 A | 2/1984 | Clabburn et al. |
| 4,470,898 A | 9/1984 | Penneck et al. |
| 4,738,318 A | 4/1988 | Boettcher |
| 4,814,546 A | 3/1989 | Whitney |
| 5,294,374 A * | 3/1994 | Martinez ............. H01C 7/13 252/516 |
| 6,124,549 A | 9/2000 | Kemp |
| 6,620,346 B1 | 9/2003 | Schulz |
| 7,435,427 B2 | 10/2008 | Vanderbist |
| 8,435,427 B2 | 5/2013 | Ghosh |
| 2006/0094818 A1* | 5/2006 | Weidinger .......... C08L 83/04 524/588 |
| 2011/0017488 A1 | 1/2011 | Denndorfer |
| 2011/0140052 A1 | 6/2011 | Somasiri |
| 2012/0049135 A1 | 3/2012 | Ghosh |
| 2013/0284486 A1* | 10/2013 | Nilsson ............... H01B 3/441 174/107 |

FOREIGN PATENT DOCUMENTS

WO    WO 2011-081795    7/2011
WO    WO 2012-078488    6/2012

OTHER PUBLICATIONS

Chapter 9 of the book entitled Dielectric Polymer Nanocomposites authored by Schadler et al. copyright Springer Science + Business Media LLC 2010.*
"High Frequency Dielectric Relaxation in Polymers Filled with Ferroelectric Ceramics" authored by Noda et al. and published in the Mat. Res. Soc. Symp. Proc. (2002) 698, EE3.8.1-EE3.8.6.*
Ziese, "Magnetoresistance switch effect in a multiferroic $Fe_3O_4$/$BaTiO_3$ $Fe_3O_4$/BaTiO3 bilayer" Applied physics letters, May 2008, vol. 88, pp. 212502-1-212502-3.
Ghosh, "Tunable-high-quality-factor interdigitated (Ba, Sr)TiO3 capacitors fabricated on low-cost substrates with copper metallization", Thin Solid Films, 2006, vol. 496, No. 2, pp. 669-673.
Donzel, "Nonlinear Resistive Electric Field Grading Part 2: Materials and Applications", IEEE Electrical Insulation Magazine, Mar./Apr. 2011, vol. 27, No. 2, pp. 18-29.
International Search Report for PCT International Application No. PCT/US2014/055635, dated Dec. 18, 2014, 3pgs.
Okamoto et al., "Non-linear electrical property of composite materials with two kinds of filler",7[th] International Conference on Solid Dielectric, Jun. 25, 2001, pp. 117-120.
Extended European Search Report, EP14848165.8, dated Apr. 24, 2017, 3 pages.

\* cited by examiner

Primary Examiner — Marc S Zimmer
(74) Attorney, Agent, or Firm — Kenneth B. Wood

(57) ABSTRACT

Compositions comprising ferrosoferric oxide dispersed in a polymer matrix. Such compositions may exhibit properties suitable for achieving both resistive field grading effects and capacitive field grading effects e.g. in electrical stress control devices and surge arrestor devices. Such compositions may optionally include one or more capacitive field grading additives and/or conductive additives.

22 Claims, 2 Drawing Sheets

COMPOSITIONS FOR ELECTRIC FIELD GRADING

BACKGROUND

Electrical stress control is often needed e.g. in high voltage cable accessories (splices and terminations) to mitigate (e.g., dissipate) high electrical stresses which may otherwise exist e.g. in areas adjacent to cable terminations.

SUMMARY

In broad summary, herein is disclosed are electric field grading compositions comprising a particulate ferrosoferric oxide material dispersed in a polymer matrix. Also disclosed are articles comprising such compositions, and methods of use. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

DETAILED DESCRIPTION

Figure 1:
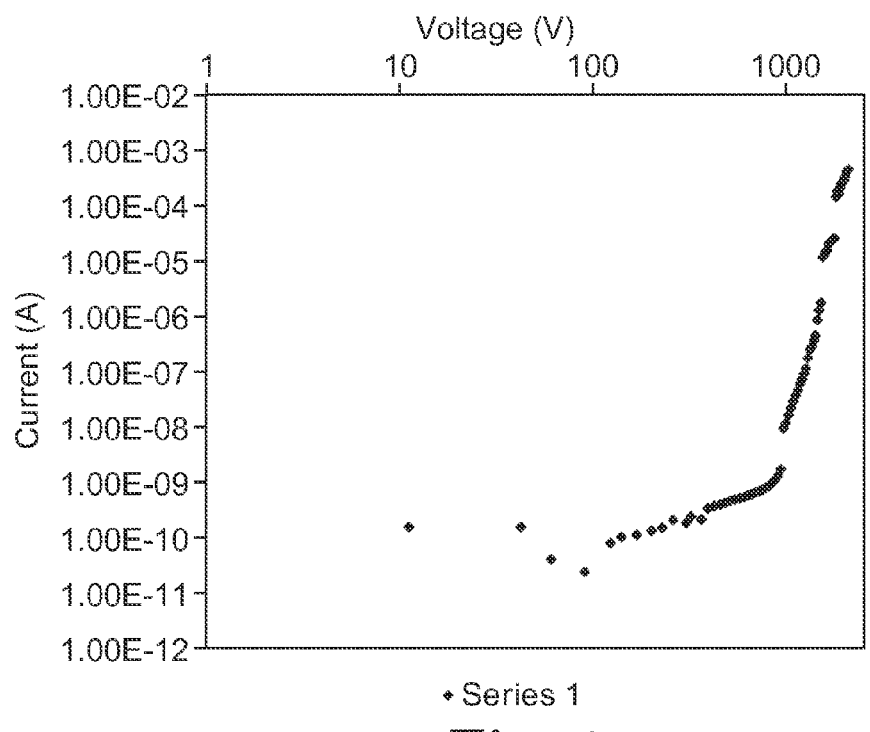
FIG. 1 depicts the experimentally observed current-voltage relationship of an exemplary composition disclosed herein.

Electrical equipment (including e.g. power cables operating at medium or high voltages, such as about 10 kV and above), can be subject to electrical stresses that may not be adequately mitigated by materials that are only electrically insulating in function (such as polymeric materials that are widely used as insulators for e.g. low-voltage cables). It may be useful to employ an electrical stress control material, e.g. a resistive grading material, in such applications. Such a resistive grading material may be a "non-linear" material (i.e., may exhibit a non-linear current-voltage relationship). By way of contrast, a "linear" material generally obeys Ohm's law (Equation 1), such that the current flowing through the material is linearly proportional to the applied voltage:

$$I=kV \qquad (1)$$

where I=current; V=voltage, and k is a constant.

A non-linear material obeys a generalized form of this (Equation 2):

$$I=kV^\gamma \qquad (2)$$

where γ (gamma) is a constant that is greater than 1, and whose value depends on the material.

The inventors have found that ferrosoferric oxide exhibits a non-linear current-voltage (I-V) relationship (also referred to as a "varistor effect") and have further found that including ferrosoferric oxide particles in a polymer matrix imparts a non-linear current-voltage relationship to the resulting composition. Accordingly, for the compositions disclosed herein, in certain ranges the current flowing through the composition can increase e.g. by orders of magnitude with only relatively small increases in voltage. In other words, the disclosed compositions exhibit an electric-field-dependent conductivity that increases strongly from a low conductivity value to a high value over a relatively narrow range of electric field. As such, a material and composition that exhibits a non-linear current-voltage relationship as disclosed herein, exhibits a threshold value of applied voltage/ electric field at which a transition between generally linear behavior (below the threshold voltage), and non-linear behavior (above the threshold) is observed. Such a threshold is visible as the "knee" of the graph shown in FIG. 1.

It has further been found that the non-linear current-voltage relationship exhibited by ferrosoferric oxide, and by compositions comprising a polymer matrix containing ferrosoferric oxide particles, is reversible. By this is meant that when the voltage is decreased (from the high voltage range back down through the above-described threshold), the current decreases accordingly, in a non-linear fashion (e.g. as demonstrated in Working Examples 2 and 3). (In all such characterizations, of course, the maximum voltages are limited so that the electric field does not exceed the irreversible breakdown field of the composition, e.g. of the polymer matrix).

It has thus been found that ferrosoferric oxide may serve very well as a resistive field grading material, due to its ability to provide a reversible, non-linear relationship between applied voltage and current flow, and due to its ability to retain this property when dispersed in a polymer matrix. Beyond this, it has also been found that ferrosoferric oxide particles exhibit moderate to high dielectric constant ($D_k$) values (e.g., about 40 or greater), along with a relatively low dielectric loss tangent (tan δ). Thus, in addition to providing the above-discussed resistive field grading, ferrosoferric oxide can advantageously provide at least some contribution to field grading by a capacitive field grading effect as well.

Ferrosoferric oxide ($Fe_3O_4$) may be produced from e.g. the mineral magnetite (and is available from a variety of vendors, e.g. under CAS No. 1317-61-9). The chemical formula of ferrosoferric oxide is often characterized as $FeO.Fe_2O_3$, and it is often referred to as iron(II, III). If desired, ferrosoferric oxide may be prepared in very pure form e.g. by the co-precipitation of iron (III) with iron (II) salts in the presence of an excess of a relatively strong base. However, it may not necessarily be required that the ferrosoferric oxide be used in a form (e.g., be subjected any particular treatment) in which trace impurities are removed (unless such impurities are found to have an adverse effect on the ability of the resulting composition to relieve electrical stress). For example, in some applications finely ground magnetite ore may be used.

In at least some embodiments, ferrosoferric oxide may be used without any particular processing (e.g., without any or all of calcining, sintering, doping, or the like) being required in order to impart the ferrosoferric oxide with acceptable resistive electric field grading properties. That is, it may merely be dispersed in an appropriate polymer matrix as described later herein. In contrast, other materials (such as e.g. zinc oxide) may need to be e.g. doped to achieve a varistor effect.

The ferrosoferric oxide may comprise any suitable particle size that allows it to be acceptably dispersed into a desired polymer matrix to form a composition as disclosed herein. In various embodiments, the ferrosoferric oxide may comprise an average particle size of no more than about 200, 100, 40, or 20 microns. In further embodiments, the ferrosoferric oxide may comprise an average particle size of at least about 0.1, 1, 2, 4, 8, or 16 microns. If desired, the ferrosoferric oxide particles may comprise any suitable surface treatment or the like that enhances the ability of the particles to be dispersed into a desired polymer matrix. For example, the particles may be treated or coated with e.g. hydrophobic groups.

In various embodiments, the ferrosoferric oxide particles may make up at least about 15, 20, or 25 volume % of the composition (that is, of the total of the polymer matrix and the ferrosoferric particles, and of any other additives if present). In further embodiments, the ferrosoferric oxide particles may comprise at most about 60, 50, 40, or 30 volume % of the composition.

The non-linear coefficient (gamma) of the composition may comprise any useful value. In various embodiments, the non-linear coefficient may be at least about 8, 10, or 12. In further embodiments, the non-linear coefficient may be at most about 20, 18, 16, or 14. In various embodiments, the overall dielectric constant of the composition may be within the range of about 10 to about 40, or within the range of about 10 to about 20. The overall loss tangent (tan δ) of the composition may be e.g. less than about 0.05, 0.03, or 0.02, when measured at a frequency of 10 kHz at room temperature.

The polymer matrix into which the ferrosoferric oxide particles are dispersed can comprise any suitable polymer material. In some embodiments, such a polymer matrix may comprise a thermoplastic composition, which may be e.g. raised to a sufficiently high temperature that the ferrosoferric oxide particles can be adequately compounded into it, and then cooled to form a solid article. Or, such a polymer matrix may comprise a thermoset material, e.g. a liquid or semi-solid material into which the ferrosoferric oxide can be dispersed and which can then be cured (by any suitable means, e.g. thermal energy, radiation, addition of catalysts and/or initiators, etc.) to form a solid article. The resulting composition might be stiff and rigid, or might be relatively elastomeric. However, it is not strictly necessary that the resulting composition be solid. Rather, it might be a semi-solid, grease, gel, wax, mastic, or even an adhesive (e.g. a pressure-sensitive adhesive), if desired.

In various embodiments, the polymer matrix may comprise e.g. urethane-based polymers; silicone-based polymers; EVA (ethylene-vinyl acetate) based polymers; EPDM (ethylene-propylene-diene rubber); olefinic polymers such as e.g. polyethylene or polypropylene; epoxy resins; and so on. It is emphasized that these are merely exemplary broad categories and that any suitable polymeric material, copolymer, or blend thereof may be used. (However, suitable polymeric materials will in general be nonconductive materials, and often may be essentially electrically insulative in nature.) The composition may also comprise any other suitable additive(s), for example to improve processability, weatherability, and so on. Potentially useful additives may thus include processing aids, mold release agents, stabilizers, antioxidants and plasticizers, and so on.

Such compositions can be provided as (e.g., shaped into) articles of any suitable form. For example, such compositions may be molded into shaped articles of any form, e.g. flat sheets, tubing or sheathing, plugs, hollow cones, and so on. If provided as a pliable layer, or as a grease, wax, gel or mastic, the composition may be shaped in the field as desired. In some embodiments, such a composition may be provided as a layer of a multilayer electrical stress control device, with the thickness of a layer being designed as needed. (For example, such a layer may be provided as part of a co-extruded annular article.) In some embodiments, an article comprising such a composition may be provided along with one or more ancillary devices, e.g. one or more connectors or terminations for an electric power cable.

The compositions disclosed herein may be suitable for use in various electrical stress control applications, because of their ability to provide a reversible non-linear current-voltage relationship. This reversibility is illustrated, for example, in FIGS. 2 and 3, which show current-voltage curves both as voltage increases and as it decreases. Compositions disclosed herein can, if desired, be repeatedly exposed to increasing and decreasing voltages and may exhibit similar (though not necessarily identical) behaviors each time (i.e. as long as the voltage does not exceed the compositions' irreversible breakdown voltage).

The compositions disclosed herein may be particularly suitable for use in voltage regulator applications, such as surge arresters, and/or in applications involving electrostatic discharge suppression. And, as mentioned, such compositions can advantageously mitigate or reduce the effect of electrical stress and may be used e.g. in terminations and connectors for electrical power cables. In some applications, the herein-disclosed compositions may serve in combinations of these functions. Advantageously, in any such application, the herein-disclosed ferrosoferric oxide-based compositions may be able to function at higher voltage levels than have been achievable with other materials used in the art.

As disclosed above, in some embodiments ferrosoferric oxide may be the only material in the composition that is active to perform resistive electric field grading. In other embodiments, one or more additional particulate materials may be present in the compositions that also perform resistive electric field grading. In various embodiments, such additional materials may be selected from the group consisting of $LuFe_2O_4$, $MoS_2$, and combinations and mixtures thereof.

In some embodiments, one or more additional materials may be present in the composition that perform capacitive (e.g., refractive) electric field grading. Any suitable particulate material that can provide this function may be used. In various embodiments, such a material may comprise a dielectric constant ($D_k$) of about 40, about 50, or greater. The combination of ferrosoferric oxide with one or more capacitive electric field grading materials may provide properties that are particularly advantageous for some applications, as is evident by inspection of e.g. FIG. 3. In various embodiments, such a capacitive electric field grading material may be selected from the group consisting of $TiO_2$, $CaTiO_3$, $SrTiO_3$, $BaTiO_3$, $BaSrTiO_3$, $SrTiO_3$, $PbTiO_3$, $Pb[Zr_xTi_{(1-x)}]O_3$, and $x[Pb(Mg_{1/3}Nb_{2/3})O_3]-(1-x)[PbTiO_3]$; and combinations and mixtures thereof. However, in other embodiments, the composition is substantially free of any capacitive-grading material (other than the ferrosoferric oxide).

In some embodiments, one or more conductive materials may be present in the composition. Any suitable particulate conductive material may be used. In some embodiments, the conductive particles may comprise an aspect ratio (that is, a ratio of longest dimension to shortest dimension, e.g. length to thickness) of at least about 5:1, 10:1, 100:1, 1000:1, or 5000:1. In particular embodiments, the conductive material may be a graphene-based material. In certain embodiments, the material may be graphene. In other embodiments, the graphene-based material may comprise e.g. doped graphene, functionalized graphene, exfoliated graphite, graphene nanoplatelets, graphite nanoplatelets, or the like. In some embodiments, a conductive material may be present in the form of carbon black. However, in other embodiments, the composition is substantially free of carbon black. In some embodiments, the composition is substantially free of any type of conductive material.

The particle size of any such additive that is active in performing electric field grading may be chosen as desired. In various embodiments, such an additive may comprise an average particle size of no more than about 200, 100, 40, or 20 microns. In further embodiments, such an additive may comprise an average particle size of at least about 0.1, 1, 2, 4, 8, or 16 microns. If desired, any such additive may comprise any suitable surface treatment or the like that enhances the ability of the particles to be dispersed into a desired polymer matrix. For example, the particles may be treated or coated with e.g. hydrophobic groups. In particular embodiments, a capacitive grading additive may be treated e.g. with nanoparticles, in the general manner described in U.S. Patent Application Publication 2011/0140052 to Somasiri.

LIST OF EXEMPLARY EMBODIMENTS

Embodiment 1 is an electric field grading composition comprising a particulate ferrosoferric oxide material dispersed in a polymer matrix, wherein the electric field grading composition exhibits a reversible non-linear current-voltage relationship. Embodiment 2 is the composition of embodiment 1 wherein the ferrosoferric oxide material is unsintered. Embodiment 3 is the composition of any of embodiments 1-2 wherein the ferrosoferric oxide material is undoped. Embodiment 4 is the composition of any of embodiments 1-3 having a dielectric constant between about 10 and about 20. Embodiment 5 is the composition of any of embodiments 1-4 wherein the ferrosoferric oxide material comprises between about 15 volume % and about 45 volume % of the composition. Embodiment 6 is the composition of any of embodiments 1-5 having a loss tangent of about 0.05 or less at a frequency of 10 kHz at room temperature.

Embodiment 7 is the composition of any of embodiments 1-6 wherein the polymer matrix comprises material selected from the group consisting of thermoplastic materials, thermosetting materials, gels, and greases. Embodiment 8 is the composition of any of embodiments 1-7 wherein the polymer matrix comprises polymers selected from the group consisting of: silicones; epoxies; ethylene-propylene-dienes; polyolefins; polyurethanes; epichlorohydrins; fluoroelastomers; and copolymers, blends and/or mixtures thereof.

Embodiment 9 is the composition of any of embodiments 1-8 further comprising a capacitive field grading particulate additive. Embodiment 10 is the composition of embodiment 9 wherein the capacitive field effect particulate additive is chosen from the group consisting of $TiO_2$, $CaTiO_3$, $SrTiO_3$, $BaTiO_3$, $BaSrTiO_3$, $SrTiO_3$, $PbTiO_3$, $Pb[Zr_xTi_{(1-x)}]O_3$, and $x[Pb(Mg_{1/3}Nb_{2/3})O_3]-(1-x)[PbTiO_3]$. Embodiment 11 is the composition of any of embodiments 1-10 further comprising a conductive particulate additive. Embodiment 12 is the composition of embodiment 11 wherein the conductive particulate additive exhibits an aspect ratio of at least about 10:1. Embodiment 13 is the composition of any of embodiments 11-12 wherein the conductive particulate additive comprises a graphene-based material. Embodiment 14 is the composition of any of embodiments 11-12 wherein the conductive particulate additive comprises graphene.

Embodiment 15 is an article comprising the composition of any of embodiments 1-14. Embodiment 16 is the article of embodiment 15 wherein the article is a surge arrestor. Embodiment 17 is the article of embodiment 15 wherein the article is an electrical stress control article. Embodiment 18 is the article of embodiment 15 wherein the article is a high voltage cable splice. Embodiment 19 is the article of embodiment 15 wherein the article is a high voltage termination.

Embodiment 20 is a method of forming an article, the method comprising: combining ferrosoferric oxide particles with a polymeric material to form a composition, and shaping the composition into an article. Embodiment 21 is the method of embodiment 20 wherein the article is a surge arrestor. Embodiment 22 is the method of embodiment 20 wherein the article is an electrical stress control article.

Embodiment 23 is a method of performing electrical stress control, the method comprising positioning an article comprising the composition of any of embodiments 1-14 in proximity to an electrical cable.

EXAMPLES

The following examples are offered to aid in the understanding of the present invention and are not to be construed as limiting the scope thereof.

Material List

| Ingredient | Product Details | Source |
|---|---|---|
| $Fe_3O_4$ | 98% | Matheson Coleman Bell, Cincinnati, OH |
| $BaTiO_3$ | 99.8% purity | Frontier Electronics, Simi Valley, CA |
| Sylgard 184 Silicone Elastomer | Liquid polymer & curing agent | Dow Corning, Midland MI |

Example Preparation

Working Example 1

A mixture of liquid silicone polymer (Sylgard 184 Silicone base, approximately 3.0 g) and liquid curing agent (Sylgard 184 Silicone curing agent, approximately 0.5 g) was placed into a small plastic container along with approximately 7.75 g of ferrosoferric oxide powder. A speed mixer (DAC 150 FVZ, Siemens) was used (at approximately 2000 rpm for approximately 60 seconds) to disperse the powder in the liquid silicone mixture. The resulting mixture was poured into a circular plastic mold and placed in a convection oven set at approximately 150° C. for approximately 1 hour. The resulting article was then sandwiched between a pair of aluminum plates and the entire stack was placed into a Carver Laboratory Press (Model No. 2699). The press was used to apply a force of approximately 6 metric tons for thirty minutes (with the sample being held at room temperature). The temperature of the sample was then increased to approximately 100° C. for approximately four hours. In multiple experiments, aluminum plates (and spacers as needed) of a variety of different thicknesses were used. The resulting articles were flexible solid sheets that ranged from of approximately 1 mm to approximately 4 mm in average thickness. These compositions and articles comprised approximately 30 volume percent ferrosoferric oxide particles (balance silicone).

The current-voltage (I-V) relationship of a representative article made as described above was determined in generally similar manner as disclosed in U.S. Pat. No. 7,435,427 to Ghosh. All the measurements were done at room temperature. The resulting data is presented in FIG. 1. In FIG. 1, only the data for increasing voltage (electric field) as shown. A transition from generally linear to non-linear behavior (in the neighborhood of 1000 V) is clearly visible in FIG. 1. The coefficient (gamma) in the non-linear range (i.e., the voltage range above the linear-nonlinear transition) was estimated to be in the range of 10-15. The frequency response of the resulting article was also evaluated, using an Agilent E4980A Precision LCR meter. Results are shown in Table 1.

TABLE 1

| | Frequency | | | |
|---|---|---|---|---|
| | 10 kHz | 100 kHz | 250 kHz | 500 kHz |
| $D_k$ | 10.66 | 10.56 | 10.40 | 10.30 |
| Tan δ | 0.004 | 0.006 | 0.015 | 0.020 |

These data indicate that the composition exhibited a moderate to high dielectric constant ($D_k$) along with low dielectric loss (tan δ).

Working Example 2

Figure 2:
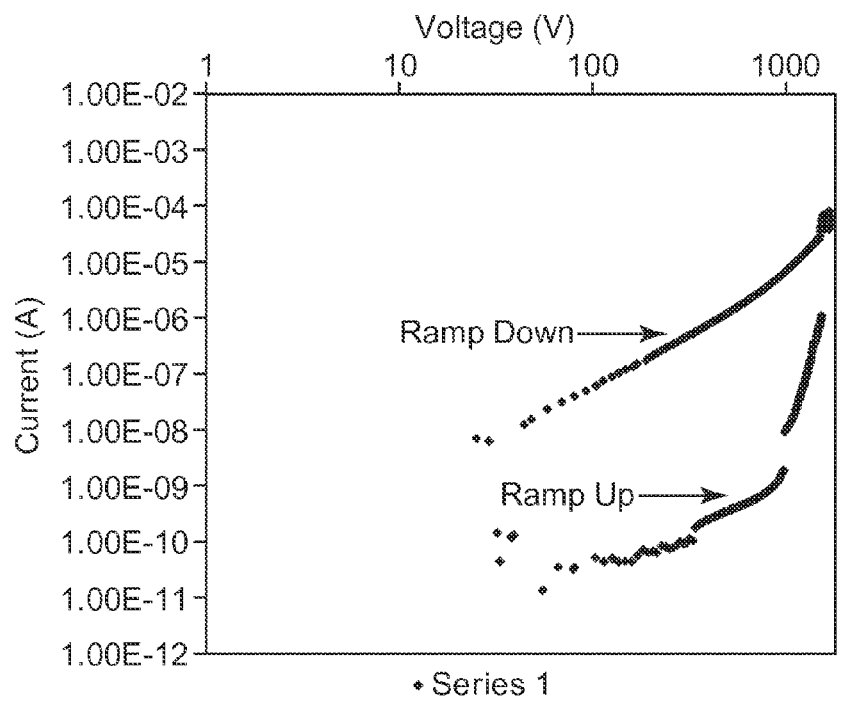
FIG. 2 depicts further details of the experimentally observed current-voltage relationship of an exemplary composition as disclosed herein.

A representative article was similarly made and tested as described in Working Example 1. However, in this case, the current was monitored during voltage ramp-down (decrease) as well as during ramp-up, as shown in FIG. 2. The reversible nature of the current-voltage relationship is evident in FIG. 2.

Working Example 3

Figure 3:
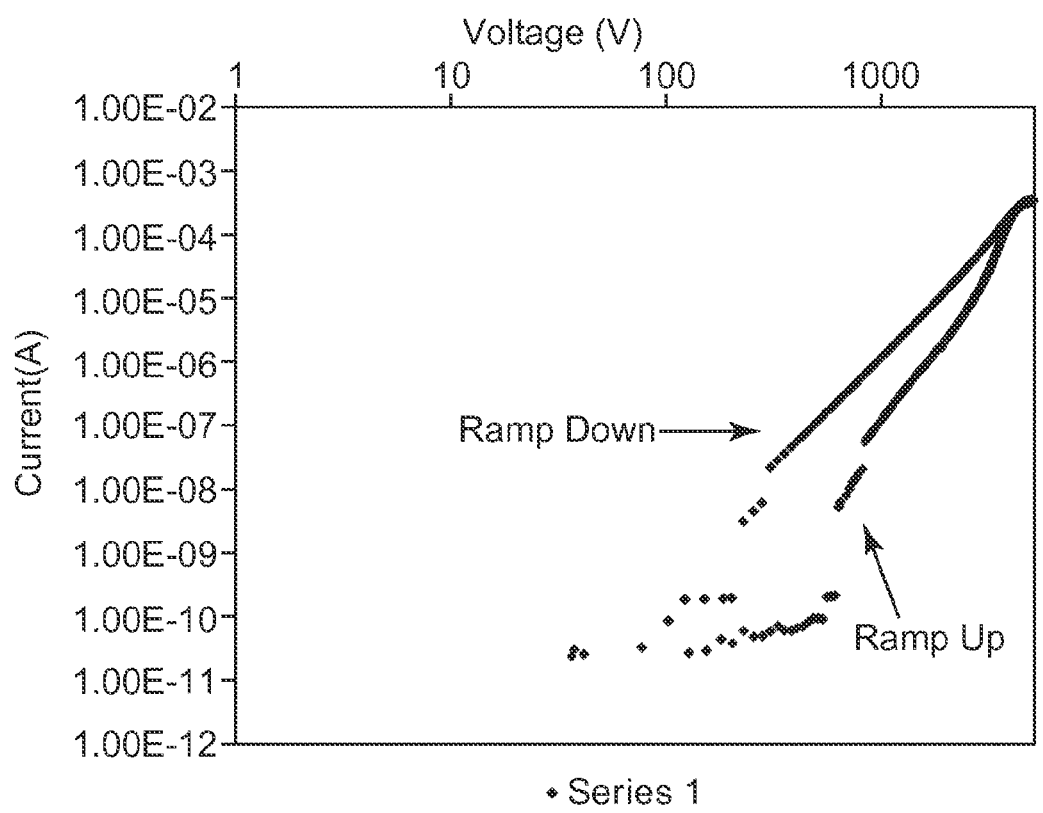
FIG. 3 depicts the experimentally observed current-voltage relationship of another exemplary composition disclosed herein.

A mixture of liquid silicone polymer (Sylgard 184 silicone elastomer base, approximately 5.5 g) and liquid curing agent (Sylgard 184 Silicone elastomer curing agent, approximately 1.0 g) was placed into a small plastic container along with approximately 10.3 g of ferrosoferric oxide powder and 8.78 g of barium titanate (BaTiO$_3$) powder. A speed mixer (DAC 150 FVZ, Siemens) was used (at approximately 2000 rpm for approximately 60 seconds) to disperse the powders in the liquid silicone mixture. The resulting mixture was cured in generally similar manner as for Working Example 1. A variety of articles were made in this manner, which articles were flexible solid sheets that ranged from of approximately 1 mm to approximately 4 mm in average thickness. These compositions and articles comprised approximately 20 volume percent ferrosoferric oxide particles and approximately 15 volume percent barium titanate particles (balance silicone). The current-voltage (I-V) and relationship of the resulting article was determined in generally similar manner as described above. Data was acquired during both ramp-up and ramp-down. Results are shown in FIG. 3. The frequency response of the resulting article was also evaluated, using an Agilent E4980A Precision LCR meter. Results are shown in Table 2.

TABLE 2

| | Frequency | | | |
|---|---|---|---|---|
| | 10 kHz | 100 kHz | 250 kHz | 500 kHz |
| $D_k$ | 16.54 | 16.46 | 16.30 | 16.28 |
| Tan δ | 0.005 | 0.006 | 0.018 | 0.027 |

The foregoing Examples have been provided for clarity of understanding only. No unnecessary limitations are to be understood therefrom. The tests and test results described in the Examples are intended solely to be illustrative, rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc. that are disclosed herein can be modified and/or combined in numerous embodiments. (In particular, any of the elements that are positively recited in this specification as alternatives, may be explicitly included in the claims or excluded from the claims, in any combination as desired.) All such variations and combinations are contemplated by the inventor as being within the bounds of the conceived invention not merely those representative designs that were chosen to serve as exemplary illustrations. Thus, the scope of the present invention should not be limited to the specific illustrative structures described herein, but rather extends at least to the structures described by the language of the claims, and the equivalents of those structures. As will be appreciated by those of ordinary skill, any characterization herein that a composition (or article) is "substantially free of" a material does not preclude the presence of some extremely low, e.g. 0.1% or less, amount of that material, as may occur e.g. when using large scale production equipment subject to customary cleaning procedures. To the extent that there is a conflict or discrepancy between this specification as written and the disclosure in any document incorporated by reference herein, this specification as written will control.

What is claimed is:

1. A electric field grading composition comprising a particulate ferrosoferric oxide material dispersed in a polymer matrix and having a dielectric constant between about 10 and about 20 as measured at a frequency within the range of 10 kHz to 500 kHz, wherein the electric field grading composition exhibits a reversible non-linear current-voltage relationship.

2. The composition of claim 1 wherein the ferrosoferric oxide material is undoped.

3. The composition of claim 1 wherein the ferrosoferric oxide material comprises between about 15 volume % and about 45 volume % of the composition.

4. The composition of claim 1 having a loss tangent of about 0.05 or less at a frequency of 10 kHz at room temperature.

5. The composition of claim 1 wherein the polymer matrix comprises material selected from the group consisting of thermoplastic materials, thermosetting materials, gels, and greases.

6. The composition of claim 1 wherein the polymer matrix comprises polymers selected from the group consisting of: silicones; epoxies; ethylene-propylene-dienes; polyolefins; polyurethanes; epichlorohydrins; fluoroelastomers; and copolymers, blends and/or mixtures thereof.

7. The composition of claim 1 further comprising a capacitive field grading particulate additive.

8. The composition of claim 7 wherein the capacitive field effect particulate additive is chosen from the group consisting of TiO$_2$, CaTiO$_3$, SrTiO$_3$, BaTiO$_3$, BaSrTiO$_3$, SrTiO$_3$, PbTiO$_3$, Pb[Zr$_x$Ti$_{(1-x)}$]O$_3$, and x[Pb(Mg$_{1/3}$Nb$_{2/3}$)O$_3$]-(1-x)[PbTiO$_3$].

9. The composition of claim 1 further comprising a conductive particulate additive.

10. The composition of claim 9 wherein the conductive particulate additive exhibits an aspect ratio of at least about 10:1.

11. The composition of claim 1 wherein the conductive particulate additive comprises graphene.

12. An article comprising the composition of claim 1.

13. The article of claim 12 wherein the article is a surge arrestor.

14. The article of claim 12 wherein the article is an electrical stress control article.

15. The article of claim 12 wherein the article is a high voltage cable splice.

16. The article of claim 12 wherein the article is a high voltage termination.

17. A method of forming an article, the method comprising: combining ferrosoferric oxide particles with a polymeric material to form a composition that exhibits a dielectric constant between about 10 and about 20 as measured at a frequency within the range of 10 kHz to 500 kHz and that exhibits a reversible non-linear current-voltage relationship, and shaping the composition into an article.

18. The method of claim 17 wherein the article is a surge arrestor.

19. The method of claim 17 wherein the article is an electrical stress control article.

20. A method of performing electrical stress control, the method comprising positioning an article comprising the composition of claim 1 in proximity to an electrical cable.

21. A electric field grading composition comprising a particulate ferrosoferric oxide material dispersed in a polymer matrix, wherein the electric field grading composition exhibits a reversible non-linear current-voltage relationship, and wherein the composition further comprises a conductive particulate additive comprising graphene.

22. An article comprising the composition of claim 21.

\* \* \* \* \*

UNITED STATES PATENT AND TRADEMARK OFFICE
CERTIFICATE OF CORRECTION

PATENT NO. : 9,876,342 B2  
APPLICATION NO. : 14/917573  
DATED : January 23, 2018  
INVENTOR(S) : Dipankar Ghosh Page 1 of 1

It is certified that error appears in the above-identified patent and that said Letters Patent is hereby corrected as shown below:

In the Specification

Column 2  
Line 42, Delete "iron(II, III)." and insert -- iron (II, III). --, therefor.

Column 4  
Lines 52-53, After "thereof." delete "However, in other embodiments.".

Signed and Sealed this
Twenty-eighth Day of August, 2018

Andrei Iancu
*Director of the United States Patent and Trademark Office*